Nov. 20, 1956   H. A. MYERS   2,771,539
APPARATUS FOR WELDING CONTACTS ONTO WIRE SPRING RELAYS
Filed Oct. 19, 1953   10 Sheets-Sheet 1
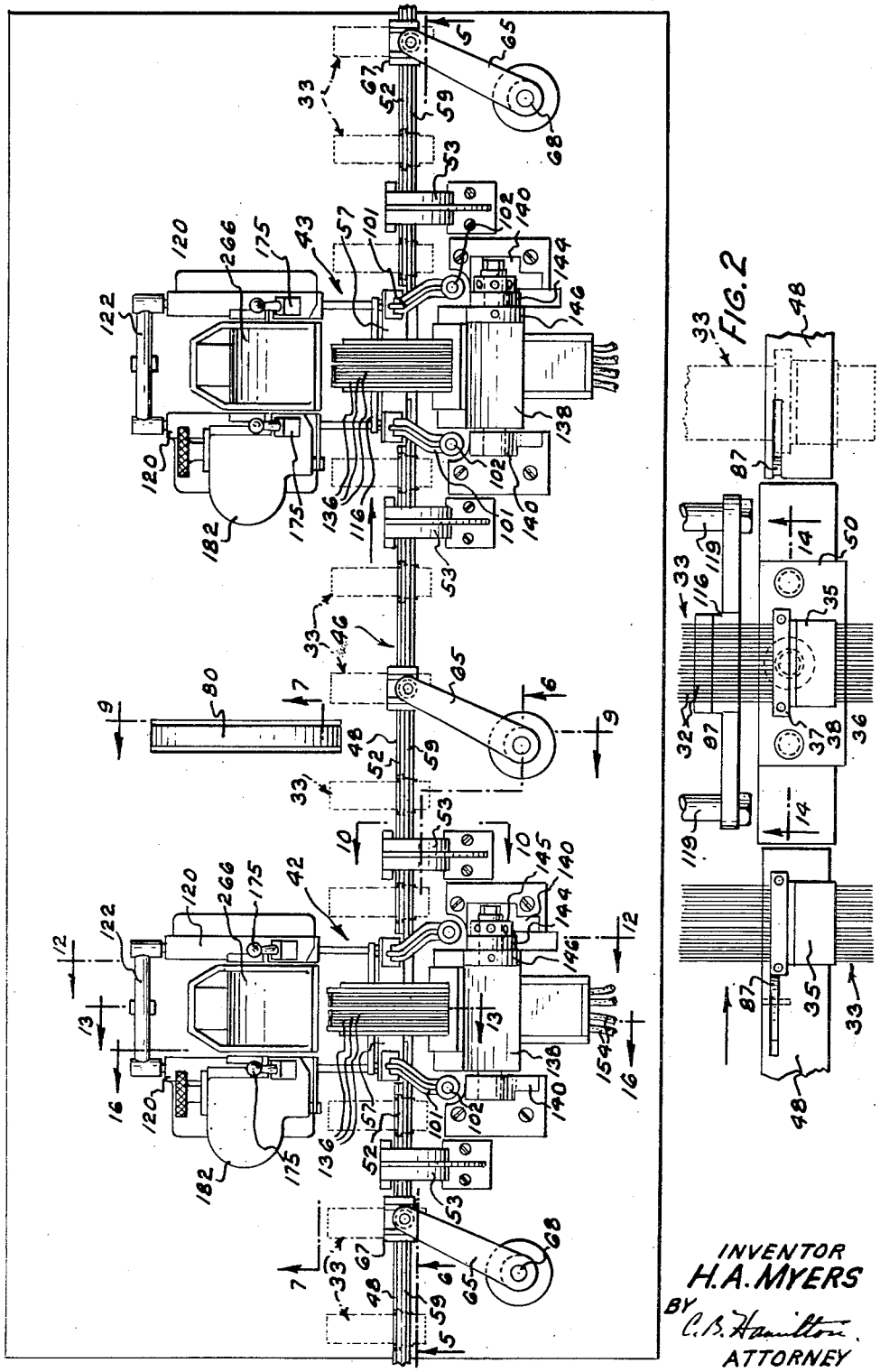
INVENTOR
H. A. MYERS
BY
C. B. Hamilton
ATTORNEY

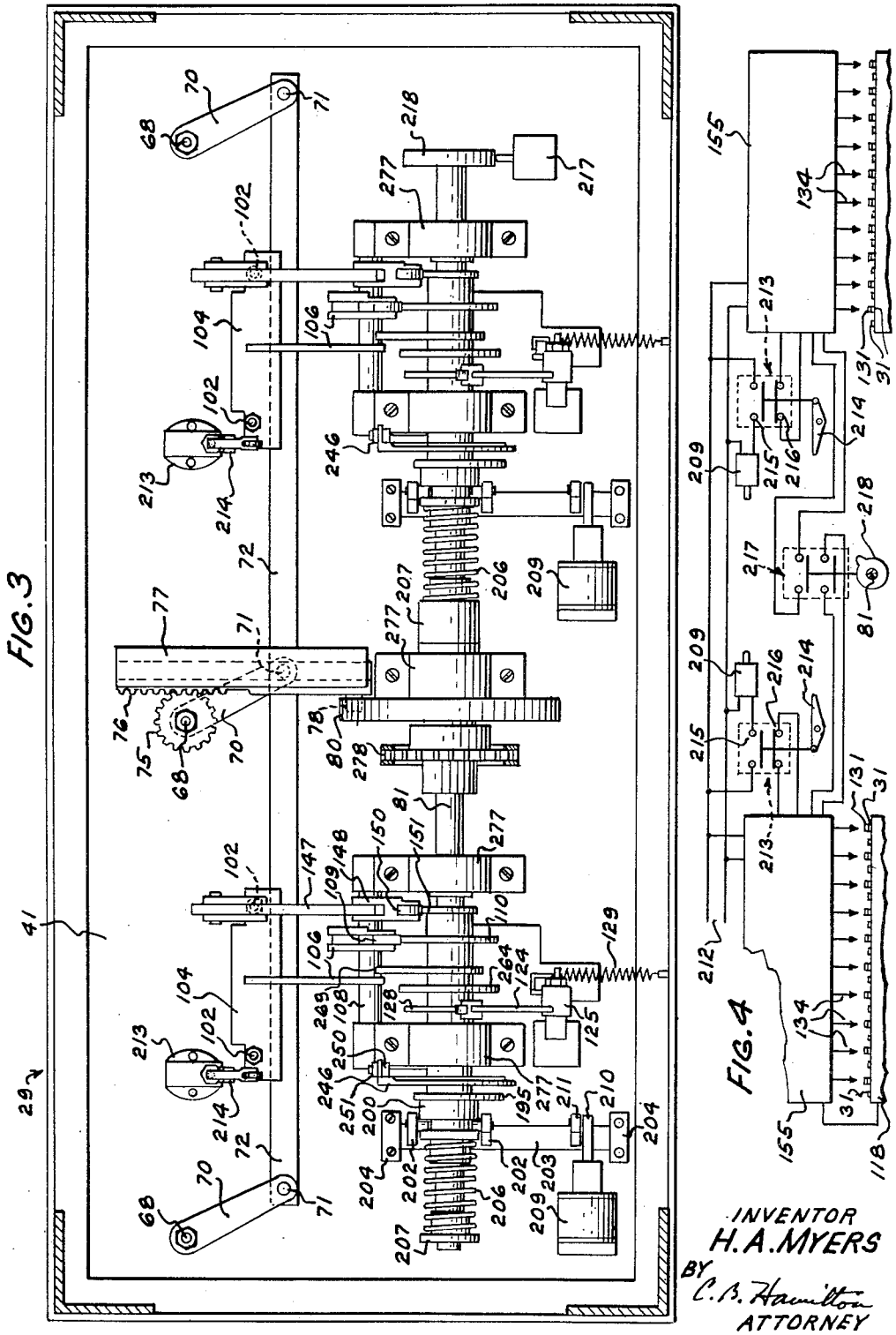

Nov. 20, 1956          H. A. MYERS          2,771,539
APPARATUS FOR WELDING CONTACTS ONTO WIRE SPRING RELAYS
Filed Oct. 19, 1953          10 Sheets-Sheet 3
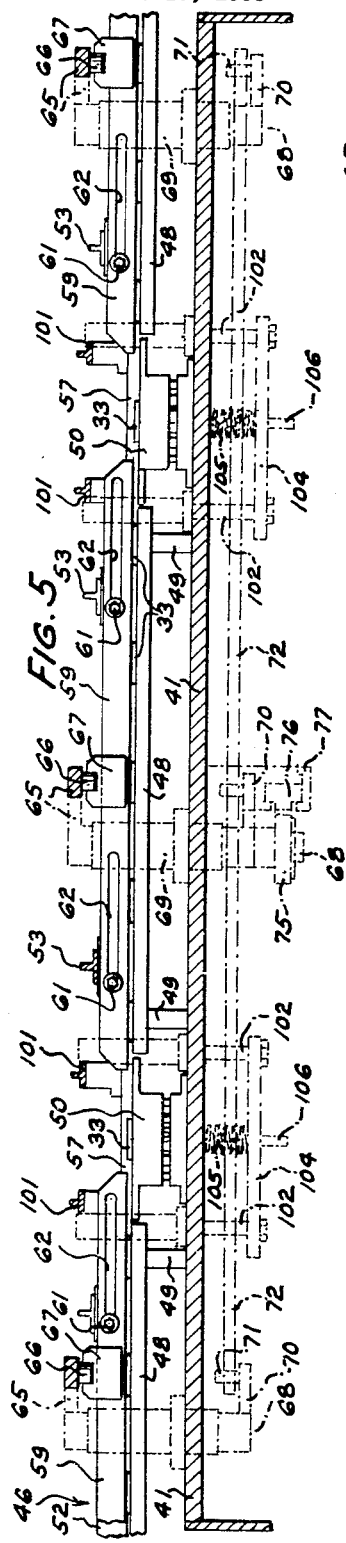
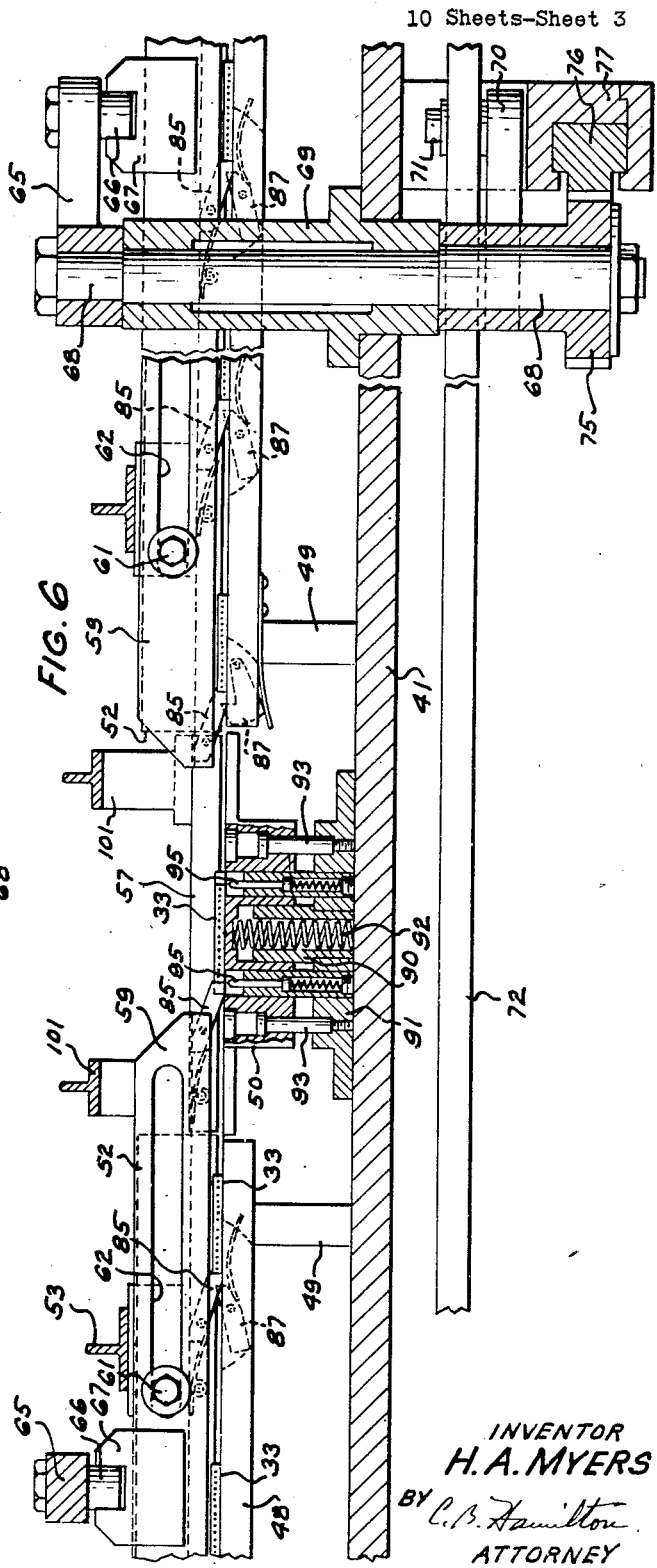
INVENTOR
*H. A. MYERS*
BY *C. B. Hamilton*
ATTORNEY Nov. 20, 1956  H. A. MYERS  2,771,539
APPARATUS FOR WELDING CONTACTS ONTO WIRE SPRING RELAYS
Filed Oct. 19, 1953  10 Sheets-Sheet 4
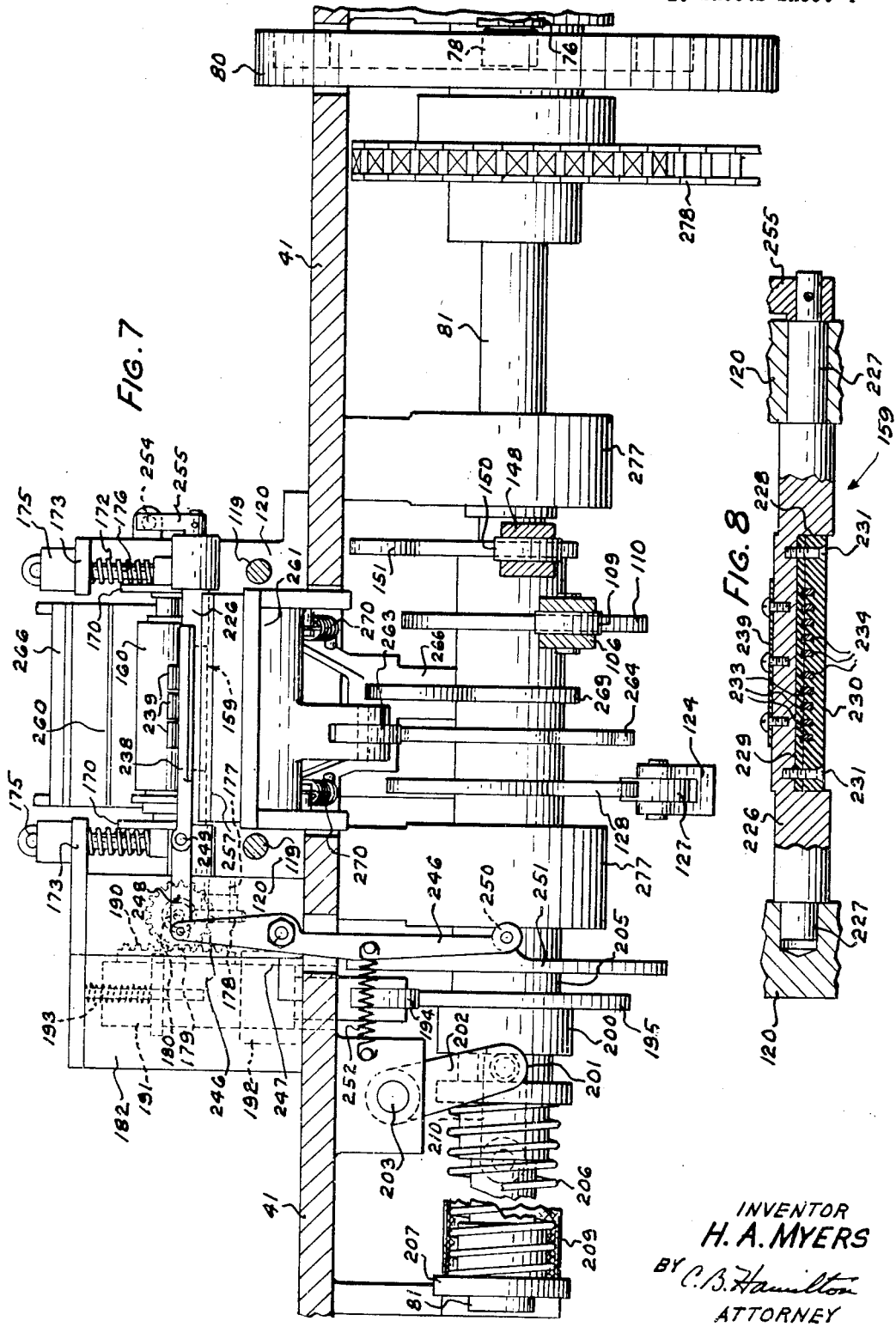
INVENTOR
H. A. MYERS
BY C. B. Hamilton
ATTORNEY

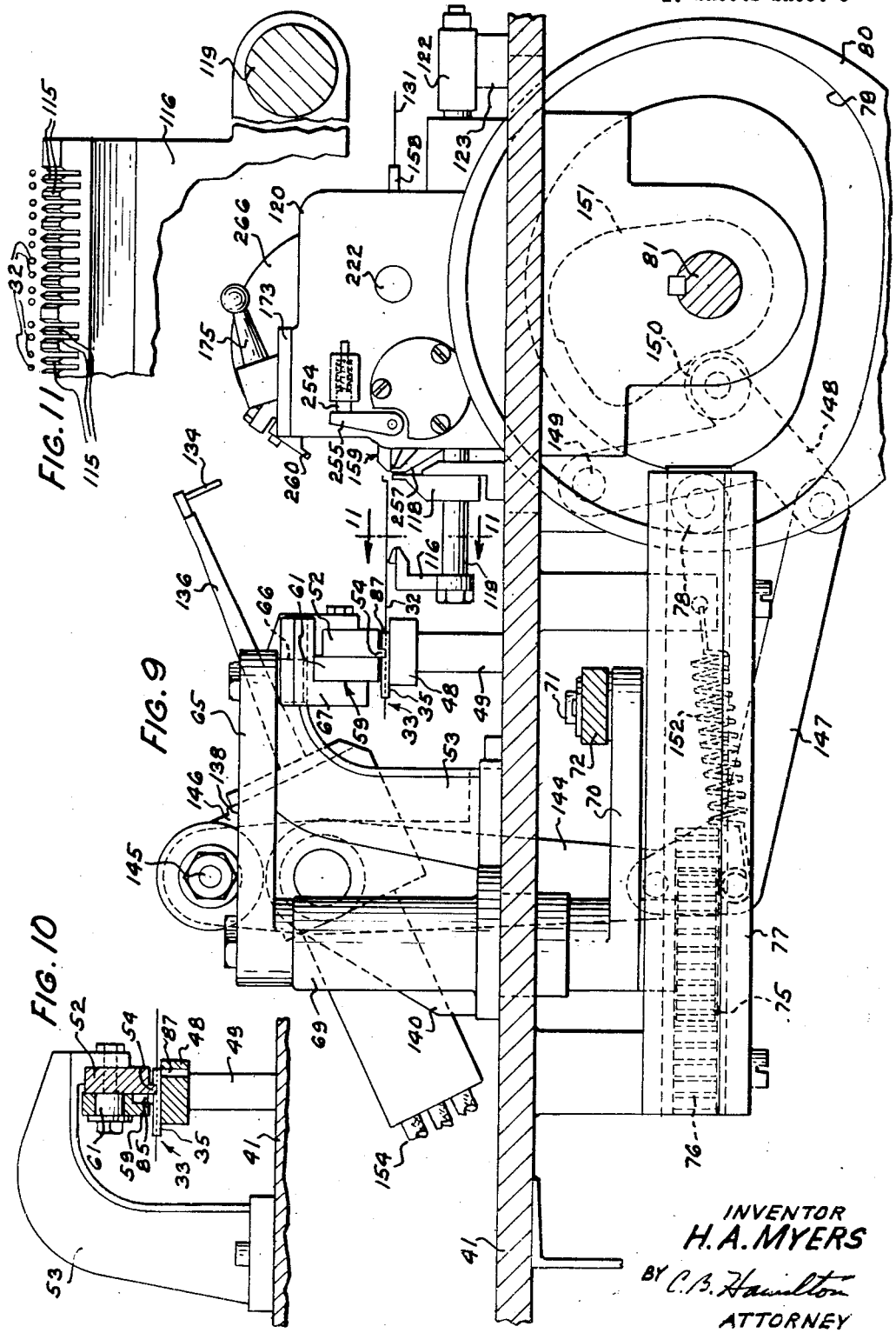

Nov. 20, 1956 — H. A. MYERS — 2,771,539
APPARATUS FOR WELDING CONTACTS ONTO WIRE SPRING RELAYS
Filed Oct. 19, 1953 — 10 Sheets-Sheet 6
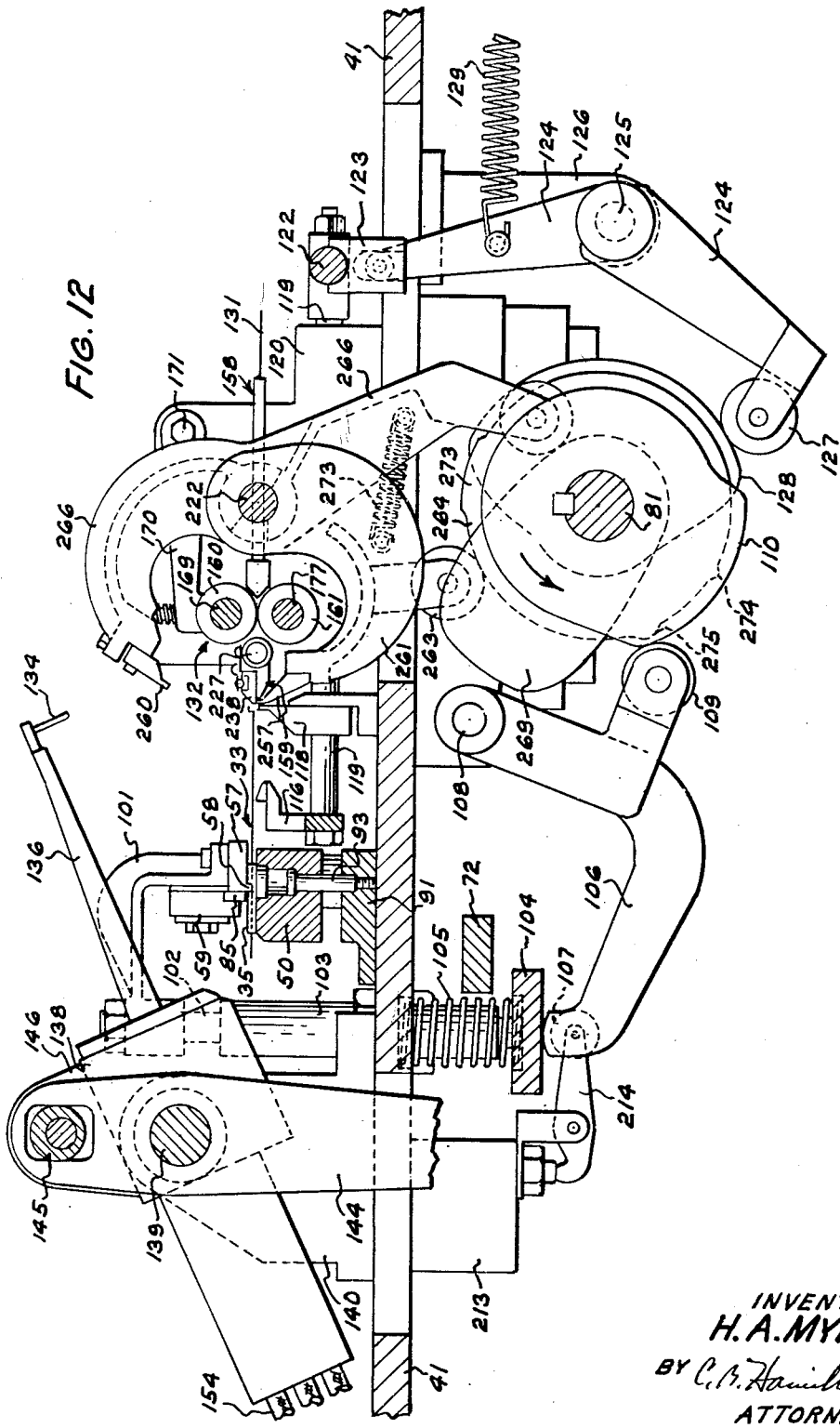
INVENTOR
H. A. MYERS
BY C. B. Hamilton
ATTORNEY

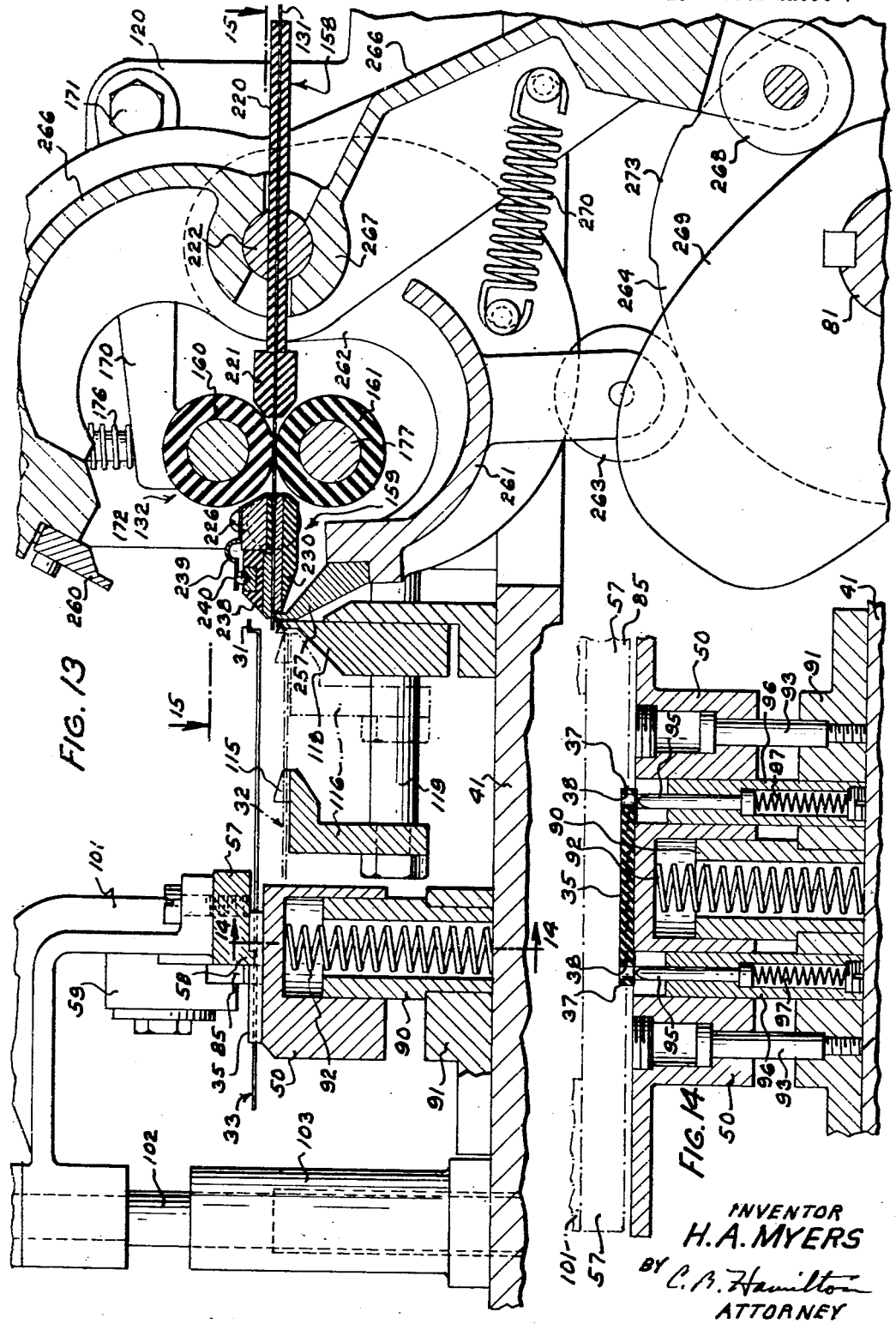

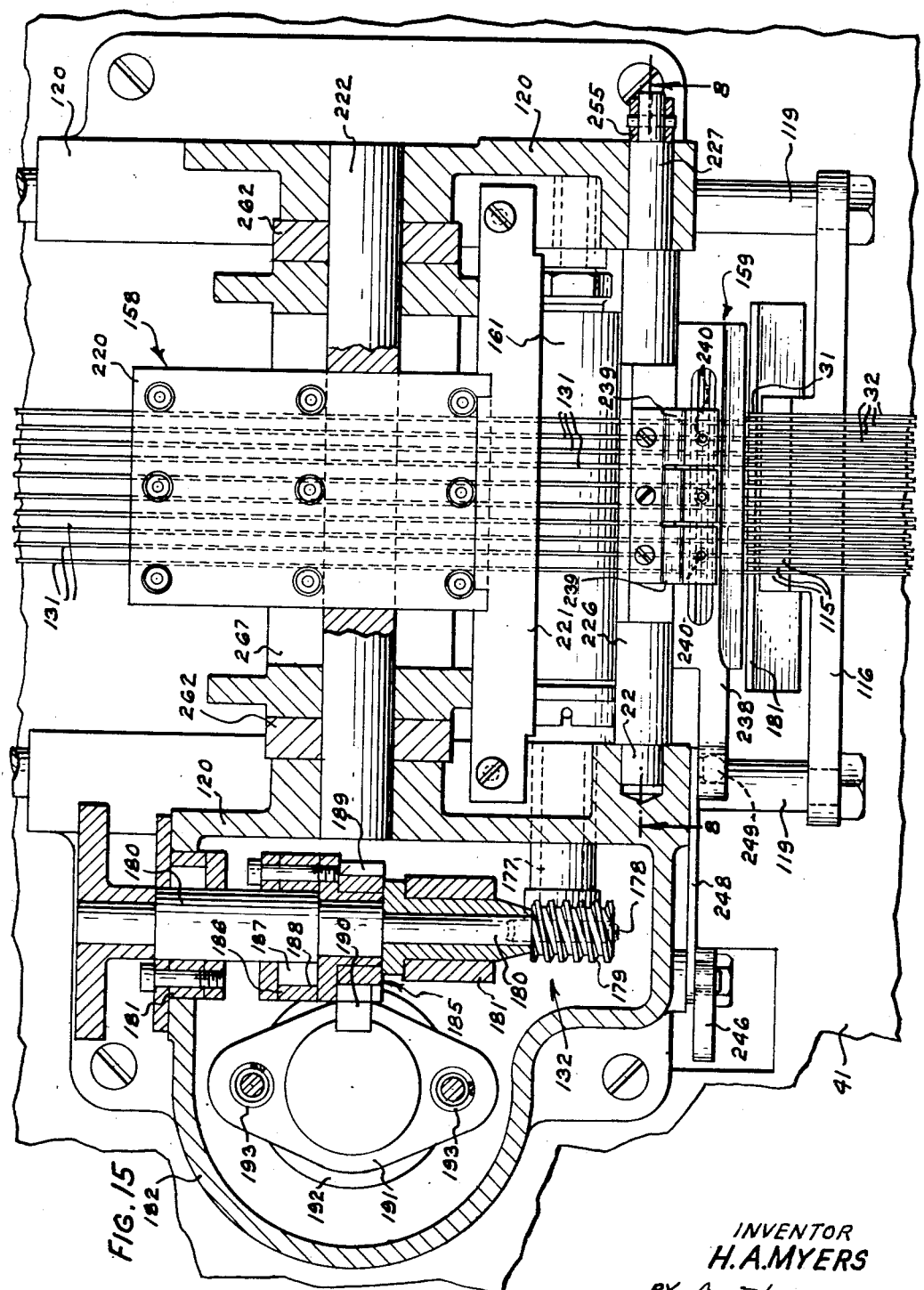

Nov. 20, 1956  H. A. MYERS  2,771,539
APPARATUS FOR WELDING CONTACTS ONTO WIRE SPRING RELAYS
Filed Oct. 19, 1953  10 Sheets-Sheet 9
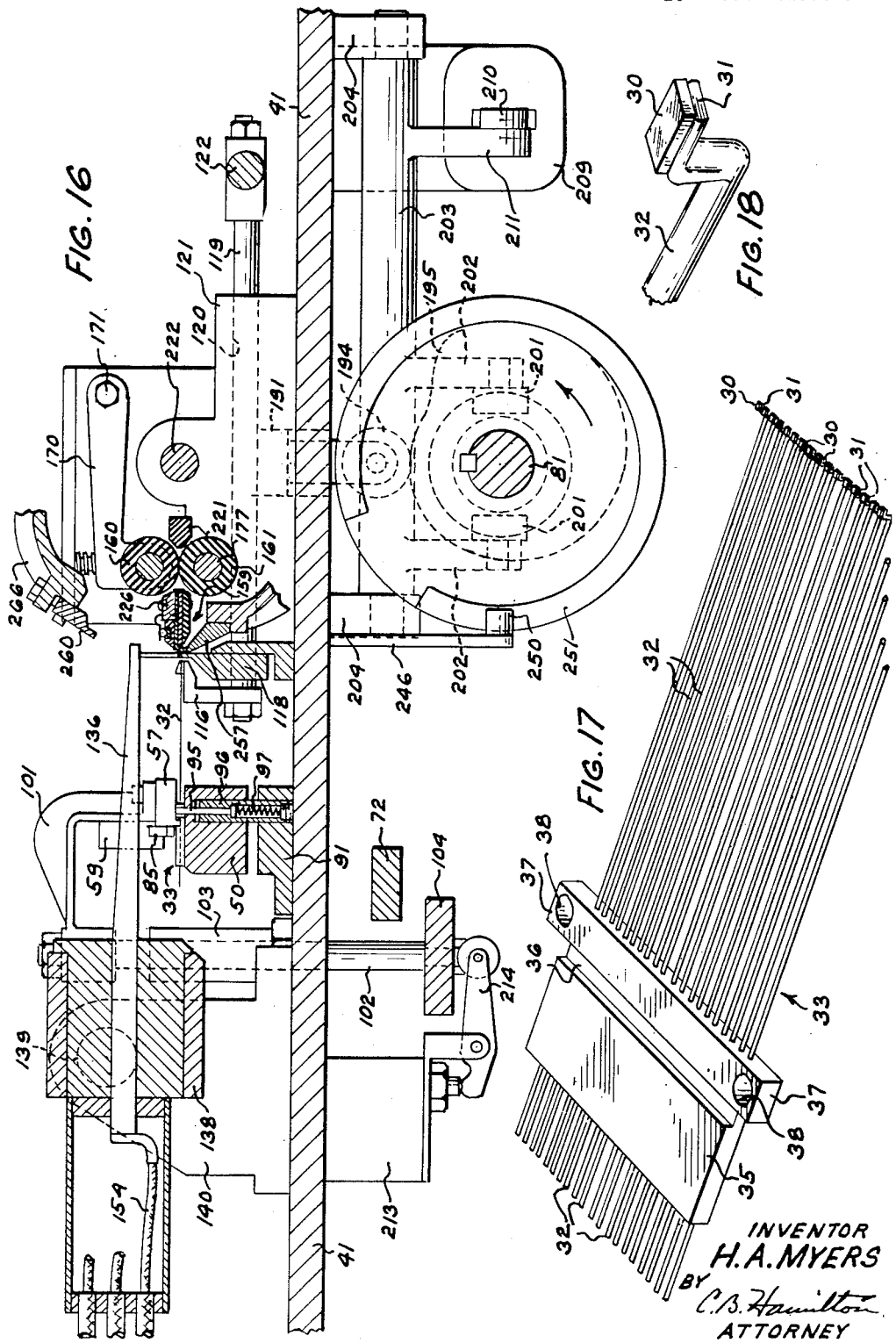
INVENTOR
H. A. MYERS
BY
C. B. Hamilton
ATTORNEY

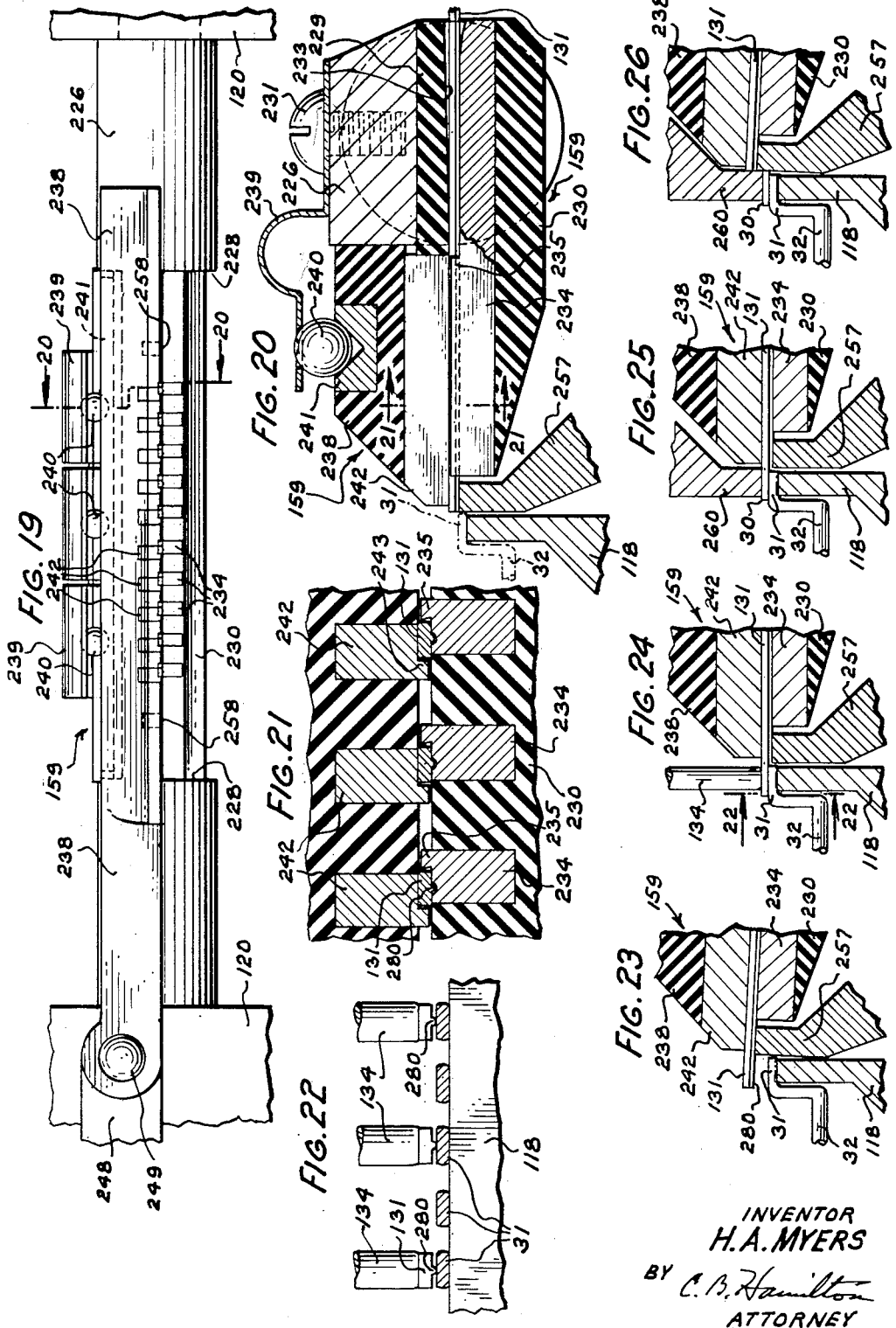

United States Patent Office 2,771,539
Patented Nov. 20, 1956

2,771,539

APPARATUS FOR WELDING CONTACTS ONTO WIRE SPRING RELAYS

Hubert A. Myers, Los Angeles, Calif., assignor to Western Electric Company, Incorporated, New York, N. Y., a corporation of New York Application October 19, 1953, Serial No. 386,742

23 Claims. (Cl. 219—79)

This invention relates to welding apparatus and more particularly to apparatus for welding contacts onto the wire springs of a relay. The present invention is an improvement over the apparatus disclosed in the application of H. A. Myers and A. L. Quinlan, Serial No. 308,738, filed September 10, 1952, on a welding apparatus, now Patent No. 2,696,545, dated December 7, 1954.

It is an object of the present invention to provide an improved apparatus for welding contacts onto electrical switch parts.

It is a further object of the present invention to provide an automatic machine for welding a plurality of contacts onto parts of an electrical relay.

In accordance with one embodiment of the invention for welding contacts onto springs of relay parts in which the springs are arranged in a row in close proximity to one another, there is provided a pair of welding stations, feed mechanism for intermittently advancing successive relay components into and out of said stations, positioning mechanism at each of said stations for holding the relay part and the springs thereof in a predetermined position relative to a plurality of contact tapes, with the contact tapes at the first station aligned with one set of alternate springs of a relay part at said first station and the contact tapes at the second station aligned with the other set of alternate springs of a relay part at the second station, tape feed mechanism operable to advance the contact tapes a predetermined distance to position the ends thereof over the ends of the springs, a plurality of welding electrodes at each station operable to clamp the ends of the tapes and the relay springs therebetween, means for passing a welding current through the electrodes to weld the ends of the tapes onto alternate sets of springs, and shearing mechanism for severing the welded ends of the contact tapes from the tape supply. Mechanism is also provided at each welding station for rendering the welding means inoperative in the absence of a relay part from the station, and for rendering the tape feed means inoperative in the absence of a relay part from the station.

Other objects and advantages of the invention will become apparent by reference to the following detailed description thereof and the accompanying drawings in which—

Fig. 1 is a plan view of the apparatus;

Fig. 2 is an enlarged plan sectional view of a portion of the relay feed mechanism and relay holder at one of the welding stations;

Fig. 3 is a bottom plan view of the apparatus, the view being rotated about the longitudinal forward edge of the apparatus relative to Fig. 1;

Fig. 4 is a fragmentary schematic wiring diagram showing some of the controls for the welding circuits;

Fig. 5 is a vertical longitudinal sectional view through the apparatus taken on line 5—5 of Fig. 1 and showing the feed mechanism for intermittently advancing the relay parts into and out of the welding stations;

Fig. 6 is an enlarged vertical longitudinal sectional view taken along the line 6—6 of Fig. 1, showing a portion of the mechanism shown in Fig. 5 for advancing the relays.

Fig. 7 is a vertical longitudinal sectional view taken on line 7—7 of Fig. 1, showing a portion of the welding mechanism at one station and the drive therefor;

Fig. 8 is an enlarged fragmentary vertical sectional view through the movable tape guide shown in Fig. 7 and taken on line 8—8 of Fig. 15;

Fig. 9 is a vertical transverse sectional view taken on line 9—9 of Fig. 1;

Fig. 10 is a fragmentary vertical transverse sectional view through the feed mechanism for advancing the relay parts and taken on line 10—10 of Fig. 1;

Fig. 11 is a fragmentary vertical elevational sectional view of the comb for aligning the wire springs of the relay at the welding station taken on line 11—11 of Fig. 9;

Fig. 12 is a vertical transverse sectional view through the apparatus taken on line 12—12 of Fig. 1;

Fig. 13 is an enlarged vertical transverse sectional view through a portion of the apparatus, taken on line 13—13 of Fig. 1, with the movable upper electrodes omitted for the sake of clearance;

Fig. 14 is a vertical longitudinal detailed sectional view of the relay part holder at one of the welding stations, taken on line 14—14 of Figs. 2 and 13;

Fig. 15 is a plan sectional view of a portion of the apparatus taken on line 15—15 of Fig. 13 and showing the tape feed and associated mechanism;

Fig. 16 is a vertical transverse sectional view taken on line 16—16 of Fig. 1 showing the upper electrodes in closed position;

Fig. 17 is a perspective view of the relay part with contacts welded to the end portions of the springs thereof;

Fig. 18 is an enlarged view of the end portion of one of the wire springs of the relay part with a contact welded thereto;

Fig. 19 is an enlarged fragmentary view of a portion of the mechanism shown in Figs. 7 and 8 for guiding the contact tapes and clamping them in predetermined spaced relation during the welding operation;

Fig. 20 is an enlarged vertical transverse detailed sectional view taken on line 20—20 of Fig. 19 through the tape guide and mechanism associated therewith;

Fig. 21 is an enlarged vertical longitudinal sectional view through the tape guide and clamping mechanism taken on line 21—21 of Fig. 20;

Fig. 22 is a detailed vertical longitudinal sectional view taken on line 22—22 of Fig. 24 showing the ends of a plurality of springs on the stationary electrode and a plurality of contact tapes in position on alternate ones thereof and the movable electrodes in engagement with the tapes; and Figs. 23 to 26, inclusive, are a series of enlarged detail views showing progressive steps in the feeding, welding, and severing of the contact tapes onto the ends of the relay springs.

The present apparatus 29 is designed to weld contacts 30 (Figs. 17 and 18) onto the flattened offset ends 31 of a plurality of wire springs 32 of a relay part 33. The wires 32 are molded in a block 35 of insulating material and are arranged in a row and with the wires grouped in pairs and with the wires of each pair spaced relatively close together and the adjacent wires of adjacent pairs spaced apart a slightly greater distance. The block 35, which is disposed intermediate the ends of the wires 32, as shown in Fig. 16, has a groove 36 formed in one face thereof and has a pair of laterally disposed ears 37 provided with apertures 38 therein, by means of which the relay part 33 may be aligned and assembled with other components to form relays.

The welding apparatus 29 comprises a base 41, on which is mounted a pair of welding stations 42 and 43 (Fig. 1) and an intermittently operated feed mechanism or conveyor 46 for moving the relay parts 33 to the left as viewed in Figs. 1, 2, 5, and 6 successively into and out of the welding stations 42 and 43. The feed mechanism 46 (Figs. 1, 5, 6, and 9) comprises a horizontally disposed stationary track 48 for supporting the relay parts 33 for horizontal movement. The track 48 is mounted on stationary posts 49 fixed to the base 41 and is formed in three sections to provide space for relay part holders 50 at the welding stations 42 and 43. The relay parts 33 are guided for movement on the track 48 by a stationary rail 52 supported by a plurality of brackets 53 (Figs. 1 and 10) and having a depending flange 54 engageable in the groove 36 of the block 35 of the relay part for preventing vertical and lateral displacement of the relay part on the track. The rails 52, like the tracks 48, are made in sections and provide space for vertically movable pusher bars 57 (Figs. 1, 5, 6, and 13) disposed above the relay part holders 50 at the welding stations 42 and 43. The pusher bars 57 have depending flanges 58 aligned with the flanges 54 of the rails 52 and engageable with the grooves 36 of the block 35 for holding the relay part 33 against lateral displacement on the holder 50.

The relay parts 33 are adapted to be placed on the track 48 and in the guideway formed by the track 48 and the rail 52 at the lefthand portion of the apparatus, as viewed in Figs. 1 and 5, and they are advanced step by step successively into the welding stations 42 and 43 by the feed mechanism, which includes a reciprocable transfer bar 59. The transfer bar 59 is made in three sections which are mounted on the sections of the rail 52 and supported for movement on rollers 61 fixed to the rails 52 and riding in slots 62 in the sections of the bar 59. The sections of the transfer bar 59 are reciprocated simultaneously by mechanism including levers 65 having rollers 66 which ride in slots formed in connector blocks 67 fixed to the sections of the transfer bar 59 (Figs. 1, 5, 6, and 9). The levers 65 are connected at one end to the upper end of vertical shafts 68, which are journalled for oscillating movement in bearings 69 fixed to the base 41. Connected to the lower end of the shaft 68 are levers 70, which are connected through pins 71 to a link 72, which serves to connect the levers 70 together for simultaneous movement. A pinion gear 75 (Figs. 6 and 9) fixed to the the lower end of the intermediate shaft 68 meshes with a rack 76, which is mounted in a guide 77 and has a cam follower 78 riding in a cam groove 79 of a cam 80 mounted on a drive shaft 81.

The transfer bar sections 58 are provided with a plurality of pivotally mounted feed pawls 85 (Figs. 6, 9, and 10) having their lower ends urged downwardly into engagement with the track 48 and engageable with one side of the relay part 33 for advancing the parts in response to movement of the transfer bar to the right, as viewed in Figs. 1, 5, and 6). Holding pawls 87 pivotally mounted in the track 48 prevent return movement of the relay parts 33 in the event that they should accidentally adhere to the reciprocable transfer bar 59. Thus, in response to each rotation of the drive shaft 81, movement is transmitted through the cam 80 and the rack and pinion 76 and 75 to oscillate the shafts 68, levers 65, and the transfer bar sections 58 to cause the relay parts 33 on the track 48 to be advanced one increment and thereby feed a relay part onto the holders 50 at the welding stations 42 and 43 and also remove one therefrom.

The mechanism at each of the welding stations is substantially identical in construction and operation and for the purposes of simplification of disclosure only the mechanism of one station will be described in detail.

The holder 50 (Figs. 5, 6, 12, 13, and 14) on which the relay parts 33 are supported at each welding station during the welding operation comprises a block recessed to receive a vertical hollow post 90 for limited vertical movement thereon. The post 90 extends upwardly from a bracket 91 secured to the base 41 and a spring 92 within the hollow post 90 urges the holder upwardly to a normal upper position with the top surface of the holder 50 flush with the top surface of the track 48 (Fig. 6). A pair of headed screws 93 fixed to the bracket 91 and slidable in recesses in the holder 50 limits the upward movement of the holder 50 to its normal upper position and the upper surface of the bracket 91 limits the downward movement of the holder. A pair of aligning pins 95 (Figs. 2 and 14) are mounted for vertical movement in a pair of hollow guide rods 96 secured to the bracket 91 and slidable in apertures in the holder 50. The aligning pins 95, which are urged upwardly by springs 97, are adapted to enter the apertures 38 in the block 35 of the relay part 33 positioned on the holder 50 to accurately align the relay part on the holder in response to the downward movement of the holder from a normal inoperative position shown in Fig. 13 to an operative position shown in Fig. 16.

The pusher bar 57 (Figs. 1, 5, 6, 12, 13, and 16), which is actuated to effect the raising and lowering of the holder 50 and the relay part 33 thereon is fixed to the lower ends of a pair of L-shaped arms 101, the opposite ends of which are fixed to the upper ends of a pair of vertically movable rods 102. The rods 102 are guided for vertical movement in guide members 103 mounted on the base 41 and are connected together by a connecting bar 104 fixed to the lower ends thereof. A spring 105 interposed between the base 41 and the connector bar 104 stresses the bar 104 and the pusher bar 57 connected thereto for movement in a downward direction, and a cam lever 106 (Fig. 12) with one end 107 thereof in engagement with the bar 104, serves to raise the bar 104 and limit the downward movement thereof. The cam lever 106 is pivotally supported at 108 and has a cam follower 109 riding on a cam 110 fixed to the drive shaft 81, whereby the cam 110 and the lever 106 in cooperation with the spring 105, controls the reciprocation of the pusher bar 57.

As the relay part 33 is moved from its upper inoperative position to its lower operative position, the wires 32 thereof are moved into the grooves formed between a plurality of teeth 115 of a locating comb or guide member 116, and the ends 31 of the wires engage and rest upon the upper narrow surface of an elongated lower stationary electrode 118 (Figs. 12, 13, and 15). The locating comb 116 is fixed to the ends of a pair of guide rods 119, which are mounted for sliding movement in apertures 120 in frame members 121 mounted on the base 41. The rods 119, at their other ends, are connected together by a connecting bar 122, which has a slotted connecting element 123 extending downwardly therefrom. Movement is imparted to the comb 116 by a bell crank lever 124 operatively connected to the slotted connecting element 123 and pivotally supported at 125 on a bracket 126, the bell crank having a cam follower 127 riding on a cam 128 fixed to the shaft 81. A spring 129 stresses the bell crank for movement in one direction and the cam 128 actuates the bell crank in the opposite direction and controls the reciprocation of the locating comb 116 from a first position, shown in full lines in Fig. 13, to a second position, shown in dotted lines in said figure, in which latter position the teeth 115 of the locating comb engage the wires 32 adjacent their ends and accurately positions the end portions 31 in a predetermined spaced relationship to each other. In this position of the relay part 33, the ends 31 of alternate wires 32 are aligned with a plurality of tapes 131 of contact material which are advanced by a tape feeding mechanism 132 to position the end portions of the tapes above and in engagement with the ends of one set of alternate wires 32.

The lower stationary electrode 118, which is supported on the base 41 has its upper end portion reduced in width to provide an elongated relatively narrow supporting surface of a length sufficient to support the end portions 31 of the wires 32 of the relay part 33. Cooperating with the electrode 118 are a plurality of upper electrodes 134 fixed to the ends of a plurality of levers 136, which are enclosed in a coating of insulating material and are supported at their other ends in a rectangular hollow carrier or holder 138 in insulated relation to each other. The carrier 138 has a pair of horizontally disposed trunnions 139, which are journalled for oscillating movement in bearing brackets 140 mounted on the base 41.

Means are provided for oscillating the carrier and the upper electrodes comprising a lever 144, which has an aperture at its upper end for receiving one of the trunnions and is adjustably connected at 145 to a lug 146 of the carrier 138. At its lower end, the lever 144 is connected to one end of a link 147, which, at its other end, is connected to a T-shaped arm 148 pivotally supported at 149 and has a cam follower 150 engageable with a cam 151 fixed to the shaft 81. A spring 152 stresses the lever 144 for movement in one direction and in cooperation with the cam 150 imparts oscillation to the lever to actuate the carrier and raise and lower the electrodes 134 to and from their upper and lower positions (Figs. 10 and 16). The number of upper electrodes 134 at each station is equal to one-half the number of wires 32 in the relay part 33 and they are arranged in alignment with the ends 31 of alternate wires 32 thereof and are adapted to be moved into engagement with the ends of the tapes positioned thereon. Each of the upper electrodes is individually connected by conductors 154 (Fig. 16) to a device 155 (Fig. 4) for supplying a welding current through the upper and the lower electrodes and the ends of the tapes and the wire springs gripped therebetween.

The tapes 132 are guided for advancing movement through stationary and movable guides 158 and 159, respectively, and are advanced by a pair of feed rolls 160 and 161 of the tape feeding mechanism 132 (Figs. 13 and 14). The upper feed roll 160 (Figs. 7 and 13) is mounted on a shaft 169, the ends of which are journalled in the ends of a pair of arms 170 mounted for pivotal movement on pins 171 fixed to the frames 120. The roller 160 is stressed for movement into engagement with the roller 161 by springs 172 disposed between the ends of the arms 170 and plates 173 on the frame members 120. The roller 160 may be moved upwardly to a raised position by cam levers 175 connected to the ends of the arms 170 by rods 176.

The lower feed roll 161 is mounted on a shaft 177 (Figs. 13, 15, and 16), which is journalled in suitable bearings formed in the frame members 120 and has a worm gear 178 fixed to one end thereof. Meshing with the worm gear 178 is a worm wheel 179 fixed to a shaft 180 mounted in bearings 181 of a housing 182 formed as part of the left-hand frame member 120 as viewed in Figs. 1, 7, and 15.

The shaft 180 is intermittently rotated through a predetermined distance for each revolution of the main drive shaft 81 to impart rotation to the feed rolls 160 and 161 to advance the tapes 131 a predetermined distance by means including a one-way clutch 185 (Fig. 15) mounted on the shaft 180. The clutch 185 comprises a cylindrical housing 186 enclosing a plurality of cylindrical rollers 187, which cooperate with cam surfaces 188 and the housing for effecting a driving connection between the clutch and the shaft in response to rotation of the housing in one direction only. A gear 189 fixed to the housing 186 of the one-way clutch 185 meshes with a rack 190, which is secured to a plunger 191 guided for vertical movement in a guideway 192 formed in the housing 182. A pair of springs 193 urge the plunger downwardly and a cam follower 194 on the lower end of the plunger rides on a cam 195 mounted for rotation with a drive shaft 81. Thus, for each rotation of the drive shaft 81, the plunger is reciprocated and motion is transmitted thereby through the one-way clutch 185 to the shaft 186 and to the lower feed roll 161, which cooperates with the feed roll 162 to grip and advance the tapes 131 a predetermined distance equal to the length of a contact 30 to position the end portions of the tapes over the ends 31 of the wires 32 aligned with the tapes.

In the event that a relay part 33 is not present at the welding station during a welding operation, means are provided for rendering the wire feed means inoperative and also for rendering inoperative the device 155 for supplying welding current to the electrodes. The cam 195 for actuating the tape feed mechanism 132 is fixed to a sleeve 200, which is splined on the main drive shaft 81 for rotation therewith and for axial movement thereon. The sleeve 200 has an annular groove formed therein in which rides a pair of blocks 201 connected to the ends of a shifting fork 202 fixed to a rock shaft 203, which is pivotally mounted at its ends in a pair of brackets 204 secured to the underside of the base 41. The cam 195 and the sleeve 200 are moved to their normal position in engagement with a shoulder 205 on the drive shaft 41 by a compression spring 206 mounted on the shaft 81 and reacting against a collar 207 fixed to the shaft. The cam 195 is adapted to be moved to the left, as viewed in Fig. 7, to disengage it from the cam follower 194 by a solenoid 209 which is secured to the base 41 and has its armature connected by means of a link 210 to an arm 211 on the rocker shaft 203.

The solenoid 209 is connected into a control circuit, shown diagrammatically in Fig. 4, and is connected to the power line 212 by a switch 213 (Figs. 3, 12, and 16), which is mounted on the underneath side of the base 41 and is actuated by a lever 214. One end of the lever 214 is mounted below and in the path of travel of the connecting bar 104 associated with the pusher bar 57 for moving the relay part downwardly to its operative position. The lever 214 is positioned relative to the normal stroke of the connector bar 104 so that during normal operation of the pusher bar 57 when a relay part 33 is present at the welding station, the relay part 33 limits the movement of the pusher bar 57, and the bar 104 does not engage the lever 214 and actuate the switch 213, but when a relay part 33 is missing at the station during a welding operation, the stroke or downward movement of the pusher 57 and the connector bar 104 is increased and the switch 213 is actuated to close the normally open contacts 215 of the switch, thereby effecting the energization of the solenoid 209 and the axial movement of the cam 195 from an operative position in alignment with the cam follower 194 of the tape feed mechanism to an inoperative position to one side of the cam follower, thus rendering the tape feed inoperative for one revolution of the shaft 81.

The switch 213 has a pair of normally closed contacts 216, which are connected into a portion of the welding circuit of the device 155 and serve to render the device 155 inoperable when the contacts 216 are open. Thus, when a relay part 33 is missing from the welding station during the welding operation, the switch 213 is actuated and the contacts 216 are opened and the device 155 is rendered ineffective to supply a welding current to the electrodes at the welding station. A switch 217, having two pairs of normally open contacts connected to the devices 155, is actuated by a cam 218 on the drive shaft 81 to close the welding circuits at the proper time to effect the welding of the tapes 131 onto the ends of the wires 32 at the welding station.

The stationary tape guide comprises members 220 and 221 of insulating material having a plurality of parallel passageways for guiding the tapes therethrough. The member 220, rectangular in form, is mounted in an aperture in a stationary shaft 222 which is secured at its ends in the frame members 120.

The movable tape guide 159 is capable of being oscillated to direct the tapes 131 above the ends 31 of the wires 32 of the relay part supported on the stationary electrode 118 and comprises a bar 226 (Figs. 7, 8, 13, 15, 19, and 20), which is provided with journals 227 supported for oscillating movement in suitable bearings in the frame members 120. The lower intermediate portion of the bar 226 is recessed at 228 for receiving a pair of blocks 229—230 of insulating material, which blocks are secured to the bar 226 by screws 231. The upper block 229 is provided with a plurality of grooves 233 for guiding the tapes 131 therethrough. The lower block 230 extends forwardly beyond the bar 226 towards the lower electrode 118 and is provided with a plurality of metal inserts 234 for supporting the tapes thereon. The inserts 234 have upwardly extending rail portions 235 (Figs. 20 and 21) for limiting the lateral movement of the tapes 231 in one direction.

Means are provided for clamping the end portions of the tapes 131 against the rails 235 to hold them in accurately aligned position relative to each other and the ends 31 of the wires 32 of the relay part during the welding operation, which means comprises a bar of insulating material 238 disposed above the forwardly projecting portion of the block 230 and in laterally abutting engagement with the bar 226. The bar 238 is adapted to be longitudinally reciprocated and is held in position by a plurality of leaf springs 239 fixed to the bar 226 and apertured to receive a portion of a plurality of metal balls 240, which ride in a V-shaped groove formed in a metal track 241 mounted in a recess in the bar 238. A plurality of metal inserts 242 are secured in recesses in the bar 238 in partially overlapping and spaced relation to the inserts 234 and the inserts 242 have flanges or rail portions 243 extending downwardly therefrom. The inserts 234 and 242 and the rails 235 and 243 thereon form guideways for the tapes 131, the parts being so arranged that in response to the movement of the clamping bar 238 to the right, as viewed in Figs. 19 and 21, the tapes 131 are gripped between the stationary rails 235 and the movable rails 243 in a predetermined accurately aligned position relative to the ends of the wires 32 of the relay part.

Reciprocable movement is imparted to the clamping bar 238 by means including a lever 246 (Fig. 7) pivotally supported at 247 to a portion of the housing 182 and connected to one end of a link 248 which is connected at its other end through a ball and socket universal connection 249 to the clamping bar 238. A cam follower 250 mounted on the lower end of the lever 246 rides on a cam 251 fixed to the shaft 81, and the cam 250, in cooperation with a spring 252, serves to control the reciprocation of the clamping bar 238. The movable tape guide 159 is stressed for movement in a counter-clockwise direction, as viewed in Fig. 13, by a spring-pressed plunger 254 (Figs. 7 and 9) mounted on one of the frames 120 and pressing against an arm 255 fixed to the end of the bar 226. The movable tape guide 159 is adapted to be raised to the position indicated in Fig. 23 by a cam actuated tape shearing member 257 prior to the feeding movement of the tape for guiding the forward end of the tape above the end portion 31 of the wire 32. The shearing member 257 is disposed between the end of the block 230 and the lower electrode 118 and the upper surface thereof is engageable with a pair of hardened pins 258 which are mounted in and extend slightly below the lower surface of the clamping bar 238 (Fig. 19). Thus, prior to the feeding movement of the tapes 131 from the position shown in Fig. 20, the movable guide member 159 is tilted to the position shown in Fig. 23, after which the tapes 131 are advanced a distance equal to the length of the contact 30 into a position above the ends 31 of the wires 32, after which the movable tape guide 159 is lowered to move the contact tape into engagement with the end of the wires 32, as shown in Fig. 24.

The shearing member 257 cooperates with a shearing member 260 to sever the welded portion of the tapes from the remainder of the tapes to form the contact 30 on the wires 32. The lower shearing member 257 is fixed to one end of a lever 261, which is curved to provide clearance for the lower feed roll 161 and has a pair of side arms 262 apertured to receive the stationary shaft 165 on which the lever 261 is pivotally mounted. The lever 261 carries a cam follower 263, which rides on a cam 264 fixed to the drive shaft 81. The upper shear member 260 is carried by a lever 266, which is curved to provide clearance for the upper feed roll 160 and has an apertured bearing boss 267 oscillatably mounted on the stationary shaft 165 between the arms 262 of the lever 261. A cam follower 268 carried by the lower end of the lever 266 rides on a cam 269 fixed to the drive shaft 81, and a pair of springs 270 interconnected between the levers 61 and 66 serves to maintain the cam followers 263 and 268 thereof in engagement with their respective cams.

The cam 264 has a rise or lobe 273, which actuates the lever 261 to raise the tape guide 159 to the position shown in Fig. 22 prior to and while the tapes 131 are being advanced, as explained above. The cam 269, in cooperation with the springs 270, moves the upper shearing blade to and from an inoperative position shown in Figs. 12 and 13 and an operative position (Fig. 25) with the lower surface of the shearing blade 260 in engagement with the tapes 131. The lower shear blade 257 engages the tapes 131 on the underneath side thereof at a point in close proximity to the ends 31 of the wires 32, and while the upper shearing blade 260 is held stationary, the lower shearing member 257 is moved upwardly by a cam lobe 274 (Fig. 12) on the cam 264 to effect the shearing of the welded end portions of the tapes 132 from the tapes to form the contacts 30 on the ends 31 of the wire 32. A cam lobe 275 on the cam 264 causes the tape guide 159 to again be raised when the relay part 33 is moved from the welding station, thus preventing any interference between the ends of the tapes 131 and the relative contacts 30 on the wires of the relay part.

The main drive shaft 81 is rotatably supported in a plurality of bearings 277 (Figs. 3 and 7) mounted on the base 41 and is driven through a chain and sprocket drive connection 278 from a speed reducer and motor, not shown.

It will be seen from the foregoing description that the relay parts 33, which are placed on the feed mechanism 46, are advanced step by step into the welding stations 42 and 43 and the parts, as they are positioned on the holders 50 at the welding stations, are moved downwardly to their operative position by the pusher bars 57 with the wires 32 fitting in the grooves between the teeth 115 of the comb 116 and the ends 31 of the wires 32 resting on the top surface of the lower stationary electrode 118. The comb 116 is then moved forwardly to support the forward ends of the wires 32 in accurately spaced relation relative to each other and in alignment with the tapes 131, which, at one of the welding stations, are aligned with one set of alternate wires 32 of the relay part 33 and at the other station are aligned with the other alternate set of wires 32 of another relay 33.

The movable tape guide 159 is then tilted upwardly and the tapes advanced a predetermined distance equal to the length of the contacts 30 at an elevation above the ends 31 of the wires 32 and the guide 159 is then lowered to move the projecting forward ends of the tapes onto the ends of the wires 32, after which the upper electrodes 135 are moved downwardly into engagement with the tapes and a welding current passed through the electrodes 135 and 118 to weld the ends of the contact tapes 131 to the ends of the wires 32. Sufficient pressure is applied to the upper electrodes 135 during the welding operation to flex the cantilevers 136 and apply a predetermined pressure to the tape so that, as the bead 280 formed on the underneath side of the tapes (Figs. 21, 22, and 23) fuses during the welding operation, the levers 136 will cause the electrodes 135 to effect a follow-up movement of the tape and maintain a relatively uniform pressure of the tape against the ends 31 of the wires 32.

After the ends of the tapes 131 have been welded to the ends 31 of the wires 32, the upper electrodes 135 are raised to their upper position and the upper shearing member 260 is moved into engagement with the upper sides of the welded ends of the tapes 131 and held in this position while the lower shearing member 257 is moved upwardly relative thereto to effect the shearing of the welded end portion of the tapes from the tapes 131 to form the contacts 30 on the ends of the wires 32. The upper shearing member 260 is then raised and the pusher 57 elevated to effect the raising of the relay part from the comb 116 and the lower electrode 118, during which movement of the relay part the tape guide 159 is also moved upwardly to prevent interference between the ends of the tapes 131 and the contacts 30 on the relay part. The feed mechanism 46 then advances the relay parts one increment, thus removing partially and completely finished relay parts 33 from the welding stations 42 and 43, respectively, and moving unfinished and partially finished parts 33 into the stations 42 and 43, respectively.

During the welding operation, a set of contacts 30 is welded at the first welding station 42 to the ends 31 of one set of alternate wires 32 on one of the relay parts and at the second welding station 43 a second set of alternate contacts 30 is welded onto the ends of the second set of alternate wires 32 of a relay part. Thus, for each rotation of the main drive shaft 81 or each cycle of operation of the welding apparatus, the welding of the contacts 30 to the ends of the wires 32, one relay part 33 is completed.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for welding contacts onto a plurality of springs of a relay part comprising a pair of welding stations, feed means for intermittently moving relay parts successively to and from said welding stations, means at said welding stations for positioning the relay part and the springs thereon in a predetermined position at said stations, means at said welding stations for feeding a plurality of contact tapes onto the ends of one set of alternate springs of the said relay part in one of said stations and onto the ends of the other set of alternate springs of the relay part in the other station, means at said welding stations for welding the ends of the tapes to the ends of said springs, and means for severing the welded ends of the tapes from the tapes to form the contacts on the springs.

2. An apparatus for welding contacts onto a plurality of springs of a relay part in which the springs are arranged in a row in close proximity one to another comprising a pair of welding stations, feed means for intermittently moving relay parts successively to and from said welding stations, holding means for receiving said relay parts at said welding stations, means for moving said holding means from normal first positions for positioning the relay parts and the springs thereon in predetermined welding stations, means at said welding stations for feeding a plurality of contact tapes onto the ends of one set of alternate springs of said relay part in one of said stations and the other set of alternate springs of the relay part in the other station, means at said welding stations for welding the ends of the tapes to the ends of said springs, means for severing the welded ends of the tapes from the tapes to form the contacts on the springs, and means at each of said stations operable in response to a predetermined movement of said holding means for individually rendering inoperative the welding means at said stations when a relay part is not present at a welding station during the welding operation.

3. An apparatus for welding contacts onto a plurality of springs of a relay part comprising a pair of welding stations, feed means for intermittently advancing relay parts successively to and from said welding stations, means at said welding stations for positioning the relay part and the springs thereon in a predetermined position at said stations, means at said welding stations for feeding a plurality of contact tapes onto the ends of one set of alternate springs of said relay part in one of said stations and the other set of alternate springs of the relay part in the other station, means at said welding stations for welding the ends of the tapes to the ends of said springs, means for severing the welded ends of the tapes from the tapes to form the contacts on the springs, and means at each station for individually rendering inoperative the tape feeding means at said welding stations when a relay part is not present at a welding station during the welding operation.

4. An apparatus for welding contacts onto a plurality of elements of a relay part comprising a pair of welding stations, feed means for advancing relay parts successively to and from said welding stations, holding means at said welding stations for receiving said relay parts, means for moving said holding means and the relay part from a normal first position to a predetermined welding position, means at said welding stations for feeding a plurality of contact tapes onto the ends of one set of alternate elements of the relay part in one of the stations and onto the other set of alternate elements of the relay part in the other station, means at said welding stations for welding the ends of the tapes to the ends of said springs, means for severing the welded tape ends from the tapes to form contacts on the elements, means operable in response to a predetermined movement of said holding means for rendering inoperative the welding means at either of said stations when a relay part is not present at that station during the welding operation, and means operable in response to a predetermined movement of said holding means for rendering inoperative the tape feeding means at either of said stations when a relay part is not present at that station during the welding operation.

5. An apparatus for welding contacts onto a plurality of springs of a relay part comprising a welding station, feed means for intermittently moving relay parts successively to and from said welding station, means at said welding station for positioning the relay part and the springs thereon in a predetermined position, means for feeding a plurality of tapes onto the ends of the springs of a relay part in said station, means at said welding station for welding the ends of the tapes to the ends of said springs, means for severing the welded ends of the tapes from the tapes to form the contacts on the springs, drive means for actuating the components of the apparatus in timed relation one to another, means operable in the absence of a relay part from said station for rendering inoperative the means for welding the tapes to the springs, and means operable in the absence of a relay part from said station for rendering the tape feed means inoperative.

6. An apparatus for welding contacts onto the ends of wire springs of a relay part comprising a welding station, a stationary electrode at said welding station, a comb at said welding station having a plurality of teeth for holding the wire springs in a predetermined spaced relation to each other, means for feeding successive relay parts with the wire springs thereof to and from said welding station, means for lowering the relay part in said welding station to move the intermediate portion of the wire springs between the teeth of the comb and the ends of the wires onto the stationary electrode, means for guiding a plurality of tapes in a predetermined spaced relation to each other over the stationary electrode and the ends of the wire springs thereon, means for moving the comb towards the stationary electrode and the ends of the wire springs to position the ends thereof in alignment with the tapes, means for feeding the tapes through a distance equal to the length of a contact to position the end portions of the tapes on the ends of the wire springs, a plurality of movable electrodes, means for moving said movable electrodes against the ends of the tapes to clamp the tapes and the ends of the wire springs between the stationary and movable electrodes, means for passing a welding current through the movable and the stationary electrodes to weld the ends of the tapes to the ends of the wire springs, means cooperable with the means for lowering the relay part for rendering the means for passing a welding current inoperative when a relay part is not present at the welding station during the welding operation, means for shearing the tapes adjacent the ends of the wires, and drive means for actuating the various components of the apparatus in timed relation one to another.

7. An apparatus for welding contacts onto the ends of wire springs of a relay part comprising a welding station, a stationary electrode at said welding station, a comb at said welding station having a plurality of grooves for holding the wire springs in a predetermined spaced relation to each other, means for feeding successive relay parts to and from said welding station, means for lowering the relay part in said welding station to move the intermediate portion of the wire springs into the grooves of the comb and the ends of the wire springs onto the stationary electrode, means for guiding a plurality of tapes in a predetermined spaced relation to each other over the stationary electrode and the ends of the wire springs thereon, means for moving the comb towards the stationary electrode and the ends of the wire springs to position the ends of the wires in alignment with the tapes, means for feeding the tapes through a distance equal to the length of a contact to position the end portions of the tapes on the ends of the wire springs, a plurality of movable electrodes, means for moving said movable electrodes against the ends of the tapes to clamp the tapes and the ends of the wire springs between the stationary and movable electrodes, means for controlling the passage of a welding current through the movable and the stationary electrodes to weld the ends of the tapes to the ends of the wire springs, means cooperable with the means for lowering the relay part for rendering the means for feeding the tapes inoperative when a relay part is not present at the welding station during the welding operation, means for shearing the tapes adjacent the ends of the wire springs, and drive means for actuating the various components of the apparatus in timed relation one to another.

8. An apparatus for welding contacts onto the ends of wire springs of a relay part comprising a welding station, a stationary electrode at said welding station, a comb at said welding station having a plurality of teeth for holding the wire springs in a predetermined spaced relation to each other, a vertically movable holder at said station for supporting a relay part thereon, means for feeding successive relay parts onto the holder at said station at one elevation above the comb and the stationary electrode, means including an actuating element engageable with the relay part for depressing the holder and the relay at said welding station to move the intermediate portions of the wire springs between the teeth of the comb and to position the ends of the wire springs on the stationary electrode, means for guiding a plurality of tapes in a predetermined spaced relation to each other over the stationary electrode and onto the end portions of the wire springs thereon, means for moving the comb towards the stationary electrode and the ends of the wire springs to position the ends thereof in alignment with the tapes, means for feeding the tapes through a predetermined distance to position the end portions of the tapes on the ends of the wire springs, a plurality of movable electrodes, means for moving said movable electrodes against the ends of the tapes to clamp the ends of tapes and the wire springs between the stationary and movable electrodes, means for passing a welding current through said movable and stationary electrodes to weld the ends of the tapes to the ends of the wire springs, means for shearing the tapes adjacent the ends of the wire springs, means cooperable with said actuating element for rendering inoperative said means for passing a welding current when a relay part is not present at the welding station during the welding operation, means cooperable with said actuating element for rendering the tape feeding means inoperative when a relay part is not present at the welding station during the welding operation, and drive means for actuating the various components of the apparatus in timed relation one to another.

9. An apparatus for welding contacts onto the ends of wire springs of a relay part comprising a welding station, a holder for said relay part at said station movable from a normal upper position to a lower operative position, means for feeding successive relay parts onto and from said holder, means including a reciprocable pusher engageable with the relay part for moving the holder and the relay part thereon to said operative position with the ends of the wire springs in welding position, the movement of said pusher being limited to one position by a relay part on the holder and being increased to a second position by the absence of a relay part from the holder, means for feeding a plurality of tapes through a predetermined distance equal to the length of the contact to position the end of the tapes on the ends of the wire springs, a plurality of cooperable welding electrodes for clamping the ends of the wire springs and the tapes therebetween, means for passing a welding current through said electrodes to weld the ends of the tapes to the ends of the wire springs, means for shearing the tapes adjacent the ends of the wire springs, means operable in response to the movement of the pusher to said second position for rendering the tape feeding means inoperative, and drive means for actuating the various components of the apparatus in timed relation one to another.

10. The combination set forth in claim 9, and means operable in response to the movement of the pusher to said second position for rendering inoperative said means for passing a welding current.

11. An apparatus for welding contacts onto the ends of wire springs of a relay part comprising a welding station, a holder for said relay part at said station movable to and from a normal upper position and a lower operative position, means for feeding successive relay parts to and from said welding station and said holder therein, means including a reciprocable pusher engageable with the relay part for moving the relay part and the holder to said operative position with the ends of the wire springs in welding position, the movement of said pusher being limited to one position by a relay part on the holder and being increased to a second position by the absence of a relay part on the holder, means including a cam and a cam actuated element for feeding a plurality of tapes through a predetermined distance equal to the length of the contact to position the end of the tapes on the ends of the wire springs, means for welding the ends of the tapes onto the ends of the wire springs, drive means for actuating the various components of the apparatus in timed relation one to another, said drive means including a cam shaft for supporting said cam thereon for rotation therewith and axial movement to and from a normal operative position for actuating said element of the tape feed means, and means operable in response to the movement of the pusher to said second position for moving said cam from said operative position for rendering said tape feed means inoperative to feed said tape.

12. In an apparatus for welding contacts onto springs of relay parts, the combination of a stationary electrode, means for supporting the end of said springs on said stationary electrode, means for feeding tapes of contact material to position the end portions thereof on the end portions of said springs, movable electrodes cooperable with said stationary electrode for clamping the ends of the tapes and the springs therebetween whereby a welding current may be passed through said electrodes to weld the ends of the tapes onto said springs, a first shearing member engageable with one side of said tapes adjacent the ends of said springs, a second shearing member engageable with the other side of the tapes, and means for moving said second shearing member to and from an operative position in engagement with said tape and to move said first shearing member relative to the second shearing member while said second shearing member is in said operative position to shear the tapes adjacent the ends of the springs.

13. In an apparatus for welding contacts onto springs of relay parts, the combination of a stationary electrode, means for supporting the ends of the springs on the stationary electrode, means including a movable guide element having a plurality of passageways for guiding tapes of contact material onto the ends of the wire springs, means for feeding the tapes to position the end portions thereof on the end portions of said springs, means for moving said guide element to and from an upper position for directing the ends of the tapes over the ends of the wire springs and a lower position with the end portions of the tapes resting on the end portions of the wire springs, movable electrodes cooperable with said stationary electrode for clamping the ends of the tapes and the wires therebetween, whereby a welding current may be passed through said electrodes to weld the ends of the tapes onto said springs, and means for severing the welded ends of the tapes from the tapes to form the contacts on the springs.

14. In an apparatus for welding contacts onto springs of relay parts, the combination of a stationary electrode, means for supporting the end portions of said springs on said stationary electrode, a guide member having a surface for supporting a plurality of tapes for movement onto the springs and having rails extending upwardly from said surface for limiting the movement of the tapes laterally in one direction, a clamping member mounted on said guide member for vertical movement therewith and for movement relative thereto transversely of said tapes and having a surface spaced from and parallel to said supporting surface on the guide member for limiting the upward movement of said tapes relative to said guide members and having a plurality of clamping rails extending downwardly from said surface for limiting the lateral movement of the tapes in the opposite direction, means for moving said guide member and the clamping member thereon to and from an upper position for guiding the ends of the tapes above the ends of the springs on the stationary electrode and a lower position with the end portions of the tapes resting on the springs, means for feeding the tapes of contact material a distance equal to the length of a contact when the guide member is in said upper position to position the end portions of the tapes over the end portions of said springs, means for laterally moving said clamping member relative to said guide member to and from a first position with the rails of said clamping and guide members guiding said tapes for advancing movement and a second position with the rails clamping the tapes therebetween in alignment with the springs, movable electrodes cooperable with said stationary electrode for clamping the ends of the tape and the springs therebetween, whereby welding currents may be passed through said electrodes to weld the ends of the tape onto said springs, and means for severing the welded ends of the tapes from the tapes to form the contacts on the springs.

15. In a welding apparatus, the combination of a plurality of welding stations, means for feeding articles successively to and from said welding stations, means for positioning the articles in a predetermined position at said stations, means for feeding a plurality of strands onto predetermined spaced portions of said articles at one station and for feeding a plurality of strands onto different predetermined portions of the article between said first-mentioned portions at another station, means at said stations for welding the ends of the strands to said portions of the articles, and means at said stations for severing the welded strand ends from the strands.

16. In a welding apparatus, the combination of a plurality of welding stations, means for feeding articles successively to and from said welding stations, means for positioning the articles in a predetermined position at said stations, means at said stations for feeding a plurality of strands onto various predetermined portions of said articles, means at said stations for welding the ends of the strands to said portions of the articles, means for severing the welded strand ends from the strands, and means at each of said stations for rendering inoperative the strand feeding means at a welding station when an article is not present at said station during the welding operation.

17. In a welding apparatus, the combination of a plurality of welding stations, means for feeding articles successively to and from said welding stations, means for positioning the articles in a predetermined position at said stations, means at said welding stations for feeding a plurality of strands onto various predetermined portions of said articles, means at said welding stations for welding the ends of the strands to said portions of the articles, means for severing the welded strand ends from the strands, means at each of said stations for rendering inoperative the strand feeding means at a station when an article is not present at said station during the welding operation, and means at each of said stations for rendering inoperative the welding means at a station when an article is not present at said station during the welding operation.

18. In an apparatus for welding contacts onto elements of relay parts, the combination of means for supporting the parts and the ends of the elements in a predetermined position, means for guiding tapes of contact material onto the ends of the elements, means for feeding the tapes, means for moving said guide means to a first position for directing the ends of the tapes in overlapping and spaced relation to the ends of the elements and to a second position to carry the tapes into engagement with the elements, means for welding the tapes to the elements, and means for severing the welded tape portions from the tapes to form contacts on the elements.

19. In an apparatus for welding contacts onto springs of relay parts, the combination of means for supporting the relay and the ends of the springs in a predetermined position, pivotally mounted guide means having a plurality of passageways in alignment with said springs for guiding tapes of contact material thereonto, means for feeding the tapes to position the end portions thereof in overlapping relation to the end portions of said springs, means for oscillating said guide means to a first position for directing the ends of the tapes over the ends of the springs and to a second position to carry the end portions of the tapes into engagement with the end portions of the springs, means for welding the tapes to the springs, and means for severing the welded ends of the tapes from the tapes to form contacts on the springs.

20. In an apparatus for welding contacts onto a plurality of springs of a relay part, the combination of means for supporting the relay part and the end portions of said springs in a predetermined position, a guide member having a surface for supporting a plurality of tapes for movement onto the end portions of said springs and having guide elements extending from said surface in a predetermined position in alignment with said springs and engageable with one edge of said tapes, a clamping member mounted on said guide member for movement transversely of said tapes and having a plurality of clamping elements engageable with the other edge of said tapes, means for feeding the tapes of contact material over the end portions of said springs, means for moving said clamping member on said guide member to a first position forming guideways for said tape and to a second position for clamping the tapes against the guide elements in alignment with the springs, means for welding the ends of the tapes to the springs, and means for severing the welded ends of the tape to form contacts on said springs.

21. In an apparatus for welding contacts onto a plurality of springs of a relay part, the combination of means for supporting the relay part and the end portions of said springs in a predetermined position, a guide member having a surface for supporting a plurality of tapes for movement onto the end portions of said springs and having guide elements extending from said surface in a predetermined position in alignment with said springs and engageable with one edge of said tapes, a clamping member mounted on said guide member for movement transversely of said tapes and having a plurality of clamping elements disposed in parallel relation to said guide elements and engageable with the other edge of said tapes, means for feeding the tapes over the end portions of said springs, means for moving said clamping member on said guide member to a first position for guiding said tapes for advancing movement and to a second position for pressing the tapes against the guide elements in alignment with the springs, and means for moving said guide member and the clamping member thereon to a first position for directing the ends of the tapes over the ends of the springs and to a second position for carrying the tapes into engagement with the springs.

22. An apparatus for welding contacts onto the end portions of a plurality of wire springs extending in parallel relation from a body of a relay part comprising a welding station, a holder at said welding station for receiving said relay part, means for feeding successive parts to and from said welding station and said holder therein, a comb at said loading station having a plurality of grooves for receiving and spacing said wires in predetermined spaced relation to each other, means for moving said holder and the relay part from a normal first position to a welding position to effect the engagement of the comb with the wire springs adjacent said body, means for supporting the end portions of said wire springs in said welding position, means for moving the comb toward said supporting means and the ends of the wire springs to position the ends of the wire springs in a predetermined position, means for guiding a plurality of tapes over the end portions of the wire springs in said welding position, means for feeding the tapes to position the end portions thereof in overlapping relation to the end portions of the wire springs, means for welding the tapes to the springs, and means for shearing the tapes adjacent the ends of the wire springs to form contacts on said springs.

23. In a welding apparatus, means for feeding articles successively to and from a predetermined welding position, means for feeding a plurality of strands onto predetermined portions of an article in the welding position, means for welding the ends of the strands to the article, means for severing the welded strand ends from the strands, means for rendering inoperative the strand feeding means when an article is not present in said welding position during the welding operation, and means for rendering inoperative the welding means when an article is not present in said welding position during the welding operation.

References Cited in the file of this patent

UNITED STATES PATENTS

| | | |
|---|---|---|
| 2,316,597 | Kershaw | Apr. 13, 1943 |
| 2,322,290 | Gabel | June 22, 1943 |
| 2,338,002 | Mero | Dec. 28, 1943 |
| 2,339,884 | Schlumpf | Jan. 25, 1944 |
| 2,343,686 | Martindell | Mar. 7, 1944 |
| 2,388,754 | Martindell | Nov. 13, 1945 |